United States Patent [19]

Oyamada et al.

[11] 4,123,405

[45] Oct. 31, 1978

[54] PROCESS FOR PRODUCING AQUEOUS EMULSIONS OF VINYL CHLORIDE/VINYL ACETATE/ETHYLENE TERPOLYMERS

[75] Inventors: Takeo Oyamada; Kazuhisa Satoh; Choji Tomizawa, all of Ichihara; Takamasa Ishihara, Minoo, all of Japan

[73] Assignee: Sumitomo Chemical Company, Limited, Osaka, Japan

[21] Appl. No.: 805,029

[22] Filed: Jun. 9, 1977

[30] Foreign Application Priority Data

Jun. 17, 1976 [JP] Japan .................................. 51/71862

[51] Int. Cl.$^2$ ............................................. C08L 33/00
[52] U.S. Cl. ..................... 260/29.6 R; 260/29.6 TA; 260/29.6 HN; 260/29.6 SQ; 260/29.6 T; 526/80; 526/331; 526/345
[58] Field of Search ......................... 526/331, 345, 80; 260/29.6 R, 29.6 TA, 29.6 HN, 29.6 SQ, 29.6 T

[56] References Cited

U.S. PATENT DOCUMENTS

| | | | |
|---|---|---|---|
| 3,632,542 | 1/1972 | Fox et al. | 260/29.6 T |
| 3,639,326 | 1/1972 | Kray et al. | 526/324 |
| 3,830,761 | 8/1974 | Lenney | 526/331 |

*Primary Examiner*—Melvyn I. Marquis
*Attorney, Agent, or Firm*—Birch, Stewart, Kolasch and Birch

[57] ABSTRACT

In the process for producing the aqueous emulsion of vinyl chloride/vinyl acetate/ethylene terpolymer by polymerizing vinyl chloride, vinyl acetate and ethylene in an aqueous dispersion system under ethylene pressure in the presence of an emulsifier and/or protective colloid using a radical initiator, the improvement which comprises adding vinyl chloride and vinyl acetate to said aqueous dispersion system at substantially fixed rates while maintaining a required amount of unreacted vinyl acetate in the system, and, after completion of addition of vinyl chloride, adding additional vinyl acetate of 3 to 20% by weight based on the total amount of vinyl acetate which has been added until that time and continuing the polymerization until the concentration of vinyl acetate in the system is decreased to 1% by weight or less, wherein the volume of the aqueous dispersion system is at least 50% by volume based on the volume of the reactor when addition of the additional vinyl acetate is completed. By this process, the amount of unreacted vinyl chloride in said aqueous emulsion can be decreased to a large extent.

4 Claims, No Drawings

PROCESS FOR PRODUCING AQUEOUS EMULSIONS OF VINYL CHLORIDE/VINYL ACETATE/ETHYLENE TERPOLYMERS

The present invention relates to a process for producing an aqueous emulsion of vinyl chloride/vinyl acetate/ethylene terpolymer wherein vinyl chloride, vinyl acetate and ethylene are polymerized in an aqueous dispersion system under ethylene pressure in the presence of an emulsifier and/or protective colloid using a radical initiator.

The aqueous emulsions of vinyl chloride/vinyl acetate/ethylene terpolymer having various proportions of the three components, and processes for producing the same by a batchwise or continuous process, are well known.

The following patents principally refer to the batchwise process. Japanese Patent Publication No. 19,179/1971 discloses an aqueous of the terpolymer containing 10 to 35% by weight of vinyl chloride, 40 to 85% by weight of vinyl acetate and 5 to 25% by weight of ethylene which can be used for making films, and a process for producing the same. German Pat. (unexamined) No. 2,001,104 discloses an aqueous emulsion of the terpolymer containing 2 to 40% by weight of vinyl chloride, 25 to 93% by weight of vinyl acetate and 5 to 30% by weight of ethylene. Japanese Patent Publication (unexamined) No. 51,020/1973 discloses an aqueous emulsion of the terpolymer containing about 35 to 90% by weight of vinyl chloride and having a glass transition point of about $-10°$ C. to about $20°$ C., and water-base paints containing the same as a binder. Japanese Patent Publication No. 32,787/1974 discloses a process for producing a stable aqueous dispersion of the terpolymer containing 10 to 80% by weight of vinyl chloride, 5 to 30% by weight of ethylene and 10 to 80% by weight of vinyl acetate which comprises adding at least 70% of the starting vinyl chloride to the reaction system continuously or intermittently using a special recipe for emulsifier composition. Japanese Patent Publication (unexamined) No. 42,939/1972 discloses an aqueous emulsion of the terpolymer containing 66 to 69% by weight of vinyl chloride, 17 to 30% by weight of ethylene and 1.0 to 10% by weight of vinyl acetate, and a process for producing the same.

The continuous process is disclosed, for example, in Japanese Patent Publication (unexamined) No. 117,586/1974 in which a stable aqueous emulsion of the terpolymer containing 20 to 89% by weight of vinyl chloride is produced by the continuous polymerization process.

In the process for producing the aqueous emulsion of vinyl chloride/vinyl acetate/ethylene terpolymer, it is important to control the formation of continuous vinyl chloride units (the term "continuous vinyl chloride unit" means a continuous chain of vinyl chloride molecules). This is particularly important when the mole number of vinyl chloride monomer is larger than that of vinyl acetate monomer. If the terpolymer has continuous long vinyl chloride units, it produces yellowing by ultraviolet rays or it becomes poor in resistances to water, alkali and heat.

Consequently, in order to decrease the continuous vinyl chloride units in the terpolymer, vinyl chloride which is more reactive than vinyl acetate and ethylene is uniformly added to the reaction system while the polymerization substantially proceeds. For this purpose, the following process is employed, as is specifically disclosed in the examples of Japanese Patent Publication (unexamined) No. 51,020/1973 and Japanese Patent Publication No. 32,787/1974 cited hereinbefore: A part of vinyl chloride monomer and/or a part of vinyl acetate monomer are first fed to a reactor, and the rests of the monomers are fed to the reactor at a fixed rate while the polymerization substantially proceeds at an almost constant ethylene pressure. After completion of the addition, the polymerization is further continued for a certain period of time with addition of a polymerization catalyst.

In this process for decreasing the continuous long vinyl chloride units in the terpolymer, the unreacted vinyl chloride is usually remained in the gaseous and aqueous dispersion phases at the end of the polymerization in an amount of at least 2,000 ppm, generally 2,000 to 6,000 ppm (converted to the basis of weight of the aqueous dispersion), though the Japanese patents mentioned above do not describe the concentration of unreacted vinyl chloride in the reactor at the end of the polymerization. It is necessary to minimize the amount of the unreacted vinyl chloride in terms of safety and sanitation for labors.

Consequently, as is described in Example 1 of Japanese Patent Publication (unexamined) No. 51,020/1973, the contents of the reactor are sent to a gas holder after the polymerization is finished, and are degassed to remove unreacted vinyl chloride as well as unreacted ethylene.

In this treatment, the unreacted vinyl chloride is removed from the resulting gas by treatment thereof with active carbon and/or combustion thereof. When the content of vinyl chloride in the gas is high, there appear various problems, such as farster lowering of the absorbability of active carbon and remarkable corrosion of the combustion equipment due to hydrogen chloride gas generated on the combustion of the gas.

Such problems are overcome by minimizing the concentration of unreacted vinyl chloride monomer in the reactor at the end of the polymerization. By the well-known polymerization processes, however, it is very difficult to decrease said concentration to 1,000 ppm or lower (converted to the basis of weight of the aqueous dispersion). For example, the concentration is usually decreased by the following treatment: After the polymerization is substantially finished, in other words, after completion of addition of vinyl chloride monomer, the polymerization is further continued for an extended period of time or is carried out at an elevated temperature or/and in the presence of an increased amount of polymerization catalyst. Even if such a treatment is employed, however, it is impossible to decrease the concentration of unreacted vinyl chloride (at least 2,000 ppm in the known polymerization processes) to half or lower thereof. When the polymerization is continued at an elevated temperature, the partial pressure of vinyl chloride gas is increased in proportion to the increment in the temperature and, as a result, a part of the vinyl chloride dissolved in the aqueous system is moved to the gaseous phase and the polymerization probability of vinyl chloride is descreased to that extent. And, the concentration of unreacted vinyl chloride monomer in the reactor is not much decreased even if the polymerization catalyst is used in a large amount. Moreover, as a large amount of the catalyst remains in the final aqueous emulsion, the emulsion becomes poor in stability and the weatherability of the terpolymer is affected very adversely.

On the other hand, a process wherein all or most of the starting vinyl chloride to be polymerized are added to a reactor prior to or at the beginning of polymerization is very effective to decrease the concentration of unreacted vinyl chloride monomer in the reactor at the end of the polymerization. As described above, however, this process promotes formation of the long vinyl chloride units, and it is particularly undesirable when vinyl chloride is used in an excess molar amount than that of vinyl acetate.

An object of the present invention is to provide an aqueous emulsion of vinyl chloride/vinyl acetate/ethylene terpolymer having a fewer number of the long vinyl chloride units and a lower concentration of unreacted vinyl chloride monomer in the reactor at the end of the polymerization, which is extremely difficult to obtain by the well-known polymerization processes.

More particularly, the present invention provides an improved process for producing an aqueous emulsion of vinyl chloride/vinyl acetate/ethylene terpolymer containing 30 to 75% by weight of vinyl chloride, 15 to 55% by weight of vinyl acetate and 5 to 35% by weight of ethylene, said terpolymer being improved in physical properties thereof by controlling the polymerization so as to proceed it stably and decreasing the long vinyl chloride units in the terpolymer, and the amount of the unreacted vinyl chloride monomer (which is designated as a specific chemical substance by the safety and sanitation law), which remains in the gaseous and aqueous phases in the reactor at the end of the polymerization, being much decreased.

Other objects and advantages of this invention will become apparent from the following description.

In the process for producing the aqueous emulsion of vinyl chloride/vinyl acetate/ethylene terpolymer by polymerizing vinyl chloride, vinyl acetate and ethylene in an aqueous dispersion system under ethylene pressure in the presence of an emulsifier and/or protective colloid using a radical initiator, the improvement of the present invention comprises a combination of the first polymerization step and the second polymerization step, the first polymerization step comprising adding successively vinyl chloride and vinyl acetate to said aqueous dispersion system at a substantially fixed rate while maintaining the concentration of unreacted vinyl acetate in the system in the range of not less than 1.5% by weight, preferably 1.5% to 15% by weight, based on the total weight of the system, and the second polymerization step comprising adding successively, after the first step is over (i.e. after completion of addition of vinyl chloride monomer), addition vinyl acetate of 3 to 20% by weight based on the total weight of vinyl acetate which has been added until that time, in order to maintain the concentration of unreacted vinyl acetate in the aqueous system unchanged, and then continuing the polymerization until the concentration of unreacted vinyl acetate in the system is decreased to 1% by weight or lower based on the total weight of the system, wherein the volume of the aqueous dispersion system is at least 50% by volume based on the volume of the reactor when addition of the additional vinyl acetate is completed.

In practicing the present invention, vinyl chloride, vinyl acetate and ethylene are polymerized in an aqueous dispersion system under ethylene pressure in the presence of a radical initiator and an emulsifier and/or protective colloid, while maintaining the pH of the system at 3 to 7 with a suitable pH-adjustor. The radical initiator may be any of those commonly used for emulsion polymerization. Among them, however, the so-called redox catalysts comprising an oxidizing agent and a reducing agent are particularly preferred in order to maintain the concentration of unreacted vinyl acetate as constant as possible during polymerization. The oxidizing agent included hydrogen peroxide, persulfates (e.g. ammonium persulfate, potassium persulfate), perborates and the like. The redusing agent includes l-ascorbic acid, sodium hydrogen sulfite, Rongalit (i.e. sodium formaldehyde sulfoxylate), glyoxalsodium hydrogen sulfite, ferrous sulfate and the like.

The emulsifier includes various kinds of nonionic or anionic surface active agent and the protective colloid includes various kinds of water-soluble high polymer, which are used for ordinary emulsion polymerization. The emulsifier and protective colloid may be used alone or in combination thereof. Suitable example of the protective colloid are polyvinyl alcohol, partially saponified polyvinyl alcohol and cellulosic derivatives (e.g. methyl cellulose, hydroxyethyl cellulose). The protective colloid is usually used in an amount of 0.05 to 5 parts by weight based on 100 parts by weight of the total monomers.

Suitable examples of the nonionic surface active agent are polyoxyethylene alkyl ethers and polyoxyethylene alkylphenol ethers (e.g. polyoxyethylene lauryl ether, polyoxyethylene octylphenol ether, polyoxyethylene nonylphenol ether), polyoxyethylene sorbitan fatty acid esters (e.g. polyoxyethylene sorbitan monolaurate, polyoxyethylene sorbitan monooleate), adducts of polyoxyethylene-polyoxypropylene block copolymers with 10 to 80% of ethylene oxide and the like. Suitable examples of the anionic surface active agent are salts of higher alcohol sulfuric esters (e.g. sodium lauryl sulfate), salts of polyoxyethylene sulfates (e.g. sodium polyoxyethylene alkyl sulfate, sodium polyoxyethylene alkylphenyl sulfate), salts of dialkylsulfosuccinates (e.g. sodium dialkylsulfosuccinate), alkylbenzenesulfonates and the like. The emulsifier is usually used in an amount of 1 to 8 parts by weight based on 100 parts by weight of the total monomers.

The pH-adjustor may be any of those conventionally used for emulsion polymerization, for example, ammonium hydrogen carbonate, sodium hydrogen carbonate, disodium hydrogen phosphate, sodium acetate, aqueous ammonia, acetic acid, hydrochloric acid and the like. These compounds may be used alone or in combination of two or more thereof.

In the polymerization, water is used as a dispersion medium in an amount of about 40 to 60% by weight based on the total weight of the aqueous dispersion system.

The polymerization temperature is kept constant during the polymerization and preferred temperature is 30° to 70° C. The temperature outside this range are not desirable because it tends to lower the rate of polymerization of vinyl chloride.

The polymerization pressure is kept constant while the polymerization is substantially carried out. In the case of the terpolymers having an ethylene content of 5 to 35% by weight which are suitable for the process of this invention, preferred ethylene pressure is 15 to 120 kg/cm$^2$.

In the first polymerization step, the concentration of unreacted vinyl acetate monomer in the aqueous dispersion system should be kept at 1.5% by weight or more based on the total weight of the system while the polymerization substantially takes place, that is to say, for a certain specified time in the period from the start of polymerization to the time when addition of vinyl chloride monomer is completed.

When the concentration is lower than 1.5% by weight, the amount of vinyl acetate is insufficient in proportion to that of vinyl chloride and hence a number of long vinyl chloride units are formed.

The upper limit of the concentration of unreacted vinyl acetate depends upon the amount of vinyl acetate and the rate of polymerization. In the case of the terpolymers having a vinyl acetate content of 55% by weight, which is the maximum amount among those suitable for the process of this invention, the upper limit is about 15% by weight at the rate at which the polymerization substantially takes place.

The rates at which vinyl chloride and vinyl acetate are added, and the proportion of the both monomers are properly determined depending upon the concentration of vinyl acetate in the aqueous dispersion system and the composition of objective terpolymers. Preferably, vinyl chloride is added in a larger molar amount than that of vinyl acetate.

In the second polymerization step, for a certain specified priod of time after completion of addition of vinyl chloride monomer, additional vinyl acetate is added in order to maintain the concentration of unreacted vinyl acetate unchanged. The additional amount is 3 to 20% by weight, preferably 5 to 15% by weight, based on the total weight of vinyl acetate which has been added until that time.

By this addition of vinyl acetate, it bacomes easy to decrease the concentration of unreacted vinyl chloride in the reactor when the polymerization is completed. That is to say, by maintaining the concentration of unreacted vinyl acetate in the aqueous dispersion system unchanged and by making the volume of the system 50% by volume or more based on the reactor, the transfer of ethylene and vinyl chloride dissolved in the aqueous system to the gaseous phase can be prevented and the concentration of unreacted vinyl chloride contained in the aqueous dispersion of the terpolymer obtained can also be decreased. The volume of the system can be easily determined considering the amount of water as dispersion medium and monomers to be used.

When the amount of additional vinyl acetate which is added successively after the first step is over, is less than 3% by weight, it becomes difficult to decrease the concentration of unreacted vinyl chloride to less than 1,000 ppm (converted to the basis of weight of the aqueous dispersion). The less the amount, the more difficult the decrease of the concentration. This difficulty is partially due to the transfer of ethylene dissolved in the monomers to the gaseous phase and this transfer takes place with the progress of the polymerization after the first step is over.

Besides, when the amount of additional vinyl acetate is more than 20% by weight, it results unfavorably in increase of the production of the terpolymer having a different composition from that of the terpolymer in the first step. In order to decrease the concentration of unreacted vinyl chloride at the end of the second step, it is efficient to increase successively the amount of additional vinyl acetate within the range of from 3% to 20% by weight in proportion of the molar ratio of the vinyl chloride and the vinyl acetate added in the first step. According to the present invention, the concentration of unreacted vinyl chloride in the reactor after completion of the polymerization can be decreased to a large extent as compared with the conventional polymerization processes. Consequently, when the contents of the reactor are transferred to a suitable gas holder and are degassed, the treatment of the vinyl chloride in the resulting gas is far easier than the conventional processes, and moreover the time required for the treatment is shorter if the degassing condition is the same.

In the process of this invention, when the contents of the reactor at the end of the second step are transferred to a suitable gas holder and degassed at 20° to 70° C. under a reduced pressure of 100 to 700 mmHg, the concentration of remaining unreacted vinyl chloride monomer in the aqueous emulsions can be decreased to less than 10 ppm. The wellknown processes for decreasing the concentration of unreacted vinyl chloride monomer may also be applied to the process of this invention.

In the production of the vinyl chloride/vinyl acetate/ethylene terpolymers according to this invention, one or more of unsaturated vinyl monomers may be copolymerized with the terpolymer. The amount of the unsaturated vinyl monomers is 10% by weight or less based on the total amount of vinyl chloride, vinyl acetate and ethylene. And, if the monomers are used in this range of amount, it does not exert any adverse effect on the polymerization process.

The copolymerizable unsaturated vinyl monomer include unsaturated vinyl monomers having a glycidyl group (e.g. glycidyl acrylate, glycidyl methacrylate); unsaturated vinyl monomers having an N-methylol group (methylol compounds such as N-methylolacrylamide, N-methylolmethacrylamide), or those having an alkoxy group (e.g. alkyl ethers of said methylol compounds such as methyl-, ethyl-, butyl-ethers); unsaturated vinyl monomers having a carboxylic group (e.g. acrylic acid, itaconic acid, maleic acid); unsaturated vinyl monomers having a hydroxyl group (e.g. acryl alcohol, 2-hydroxyethyl methacrylate, monoacryl ethers of polyhydric alcohols); unsaturated vinyl monomers having a sulfonic group vinyl esters of the formula

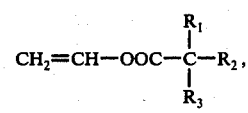

wherein $R_1$, $R_2$ and $R_3$ are each a hydrogen atom or an alkyl group and the total number of the carbon atoms of $R_1$, $R_2$ and $R_3$ is 1 to 18 (e.g. vinyl propionate, vinyl butyrate, vinyl pivalate, vinyl laurate, vinyl versatate); unsaturated carboxylic esters produced from unsaturated carboxylic acids or unsaturated dicarobxylic acids and alcohols having 1 to 12 carbon atoms (e.g. methyl acrylate, ethyl acrylate, butyl acrylate, 2-ethylhexyl acrylate, lauryl acrylate, methyl methacrylate, ethyl methacrylate, butyl methacrylates, lauryl methacrylate; dimethyl esters, dibutyl esters or di-2-ethylhexyl esters of itaconic acid, maleic acid or fumaric acid) and the like.

When the process of this invention is compared with the conventional processes including no operation corresponding to the second step of this invention, the vinyl chloride/vinyl acetate/ethylene terpolymers ultimately obtained by the process of this invention comprises two terpolymers of different composition in a strict sense, the one being terpolymer in the second step and the other being the terpolymer in the first step (corresponding to the terpolymer of the conventional processes). But such difference does not exert an adverse effect at all on the physical properties of the present emulsions and films formed therefrom, and on other performances in various applications thereof. The aqueous emulsions of this invention can be used as adhesives, vehicles for paints and binders for fiber- or paper-processing.

The present invention will be illustrated with reference to the following examples, but the present invention is not limited to these examples.

EXAMPLE 1

The following materials were charged in a 90-liter pressure reactor equipped with a temperature regulator and a stirrer:

| | |
|---|---|
| Water | 32,000 g |
| Ethylene oxide adduct of hydroxyethyl cellulose (addition molar number: 1.5) | 240 g |
| Polyoxyethylene nonylphenol ether (H.L.B. 17) | 320 g |
| Polyoxyethylene nonylphenol ether (H.L.B. 14) | 320 g |
| Acetic acid | 16 g |
| Sodium acetate | 20 g |
| $FeSO_4$ | 0.8 g |
| 8 % Aqueous Rongalit solution | 2,880 g |
| Vinyl acetate | 3,590 g |

The reactor was purged with nitrogen and ethylene to remove oxygen. 5,110 g of vinyl chloride was charged and then ehtylene was charged until a pressure of 60 kg/cm² was reached. Thereafter, the supply of an 8% aqueous ammonium persulfate solution was started to initiate the polymerization. The polymerization temperatures was kept at 50° C. by adjusting the temperature regulator.

Next, the supply of 12,000 g of vinyl chloride and 8,380 g of vinyl acetate was started and both the vinyl chloride and vinyl acetate were added at a fixed rate over 4.5 hours. While the both compounds were supplied, the supply of ethylene was stopped to maintain a polymerization pressure of 60 kg/cm², and the concentration of unreacted vinyl acetate was kept at 5.5 to 4.5% by weight based on the total weight of the reaction system. Thereafter, 960 g of vinyl acetate corresponding to 8% by weight of the vinyl acetate supplied until that time was successively added over 1 hour. After the polymerization for 7 hours, the concentration of unreacted vinyl acetate in the reaction system was decreased to 0.46% by weight.

At that time, the supply of ammonium persulfate which has been automatically carried out to maintain a polymerization temperature of 50° C. was stopped and the reaction system was cooled to finish the polymerization.

The contents of unreacted vinyl chloride in the gaseous phase and aqueous dispersion phase in the reactor at the end of the polymerization were analyzed by gas chromatography.

The concentration of vinyl chloride in the gaseous phase was 1.0% which correspond to 240 ppm when converted to the basis of weight of the aqueous dispersion. The concentration in the aqueous phase was 331 ppm.

The contents of the reactor was transferred to a 200-liter gas holder kept at a reduced pressure of 330 mmHg and degassed at 45° C. for about 2 hours. By this treatment, the amount of the unreacted vinyl chloride monomer in the aqueous emulsion was reduced to 8 ppm.

The ultimately obtained aqueous emulsion of vinyl chloride/vinyl acetate/ethylene terpolymer had a solid content of 50.2% by weight and a viscosity of 910 cps. The content of coarse particles in the emulsion which were not passable through a 100-mesh wire net was 16 ppm. It was found by the chlorine analysis and the hydrolysis method that the terpolymer contained 45.7% by weight of vinyl chloride, 36% by weight of vinyl acetate and 18.3% by weight of ethylene.

Comparative Example 1

The polymerization procedure was carried out in the same manner as in Example 1 until addition of vinyl chloride and vinyl acetate was finished. That is, 12,000 g of vinyl chloride and 8,380 g of vinyl acetate were added over 4.5 hours after the polymerization was started. Thereafter, the polymerization was continued for further 1.5 hour, by which the concentration of unreacted vinyl acetate was decreased to 0.40% by weight. After ageing for 1 hour, the supply of ammonium persulfate which has been automatically carried out to maintain a polymerization temperature of 50° C. was stopped and the reaction system was cooled to finish the polymerization.

The content of unreacted vinyl chloride in the reactor at the end of the polymerization was analyzed in the same manner as in Example 1.

As the result, the concentration of vinyl chloride in the gaseous phase was 6.0% which corresponded to 1,420 ppm when converted to the basis of weight of the aqueous dispersion. The concentration in the aqueous phase was 1,690 ppm.

The contents of the reactor was degassed in the same manner as in Example 1. After degassing for about 2 hours, the concentration of unreacted vinyl chloride in the aqueous liquor was 60 ppm.

The ultimately obtained aqueous emulsion of vinyl chloride/vinyl acetate/ethylene terpolymer had a solid content of 49.7% by weight and a viscosity of 720 cps. The content of coarse particles in the emulsion which were not passable through a 100-mesh wire net was 26 ppm. It was found by the chlorine analysis and the hydrolysis method that the terpolymer contained 45.2% by weight of vinyl chloride, 36.9% by weight of vinyl acetate and 18.9% by weight of ethylene.

EXAMPLE 2

The following materials were charged in a 90-liter pressure reactor equipped with a temperature regulator and a stirrer:

| | |
|---|---|
| Water | 30,000 g |
| Partially saponified polyvinyl alcohol (saponification degree: 89 mole %) | 300 g |
| Polyoxyethylene nonylphenol ether (H.L.B. 17) | 340 g |
| Polyoxyethylene nonylphenol ether (H.L.B. 14) | 340 g |
| Sodium acetate | 20 g |
| $FeSO_4$ | 0.8 g |
| 8 % Glyoxal sodium hydrogen sulfite | 2,900 g |
| Vinyl acetate | 2,730 g |

The reactor was purged with nitrogen and ethylene to remove oxygen. 4,380 g of vinyl chloride was charged and then ethylene was charged until a pressure of 70 kg/cm² was reached. Thereafter, the supply of an 8% aqueous ammonium persulfate solution was started to initiate the polymerization. The polymerization temperature was kept at 50° C by adjusting the temperature regulator.

Next, the supply of (1) 13,740 g of vinyl chloride, (2) a mixture of 1,000 g of N-n-butoxymethylacrylamide and 6,500 g of vinyl acetate and (3) a solution of 650 g of acrylic acid in 2,000 g of water, was started. The vinyl chloride (1) was added at a fixed rate over 4.5 hours, the mixture (2) was added at a fixed rate over 5.5 hours, and the solution (3) was added at a fixed rate over 5.5 hours. While these compounds were added, the supply of ethylene was stopped to maintain a polymerization pressure of 60 kg/cm$^2$ until the supply of vinyl chloride was completed. The concentration of unreacted vinyl acetate in the aqueous dispersion system was kept at 3.5 to 3.0% by weight until addition of vinyl chloride monomer was completed. After the polymerization for 6.7 hours, the concentration of unreacted vinyl acetate in the reaction system was decreased to 0.40% by weight. At that time, the supply of ammonium persulfate which has been automatically carried out to maintain a polymerization temperature of 50° C. was stopped and the reaction system was cooled to finish the polymerization.

The content of unreacted vinyl chloride in the reactor at the end of the polymerization was analyzed in the same manner as in Example 1.

As the result, the concentration of vinyl chloride in the gaseous phase was 0.9% by weight which corresponded to 221 ppm when converted to the basis of weight of the aqueous dispersion. The concentration of vinyl chloride in the aqueous phase was 280 ppm. Next, degassing was carried out in the same manner as in Example 1. After the degassing for about 2 hours, the concentration of unreacted vinyl chloride in the aqueous liquor was 4 ppm.

The ultimately obtained aqueous emulsion had a solid content of 50.5% by weight and a viscosity of 1,210 cps. The content of coarse particles in the emulsion which were not passable through a 100-mesh wire net was 10 ppm. It was found by the chlorine analysis and the hydrolysis method that the terpolymer contained 55% by weight of vinyl chloride, 22.2% by weight in total of ethylene and N-n-butoxymethylacrylamide, and 22.8% by weight in total of vinyl acetate and acrylic acid.

Comparative Example 2

The following materials were charged in a 90-liter pressure reactor equipped with a temperature regulator and a stirrer:

| | |
|---|---|
| Water | 32,000 g |
| Ethylene oxide adduct of hydroxyethyl cellulose (addition molar number: 1.5) | 240 g |
| Polyoxyethylene nonylphenol ether (H.L.B. 17) | 320 g |
| Polyoxyethylene nonylphenol ether (H.L.B. 14) | 320 g |
| Acetic acid | 16 g |
| Sodium acetate | 20 g |
| FeSO$_4$ | 0.8 g |
| 8 % Agueous Rongalit solution | 2,880 g |
| Vinyl acetate | 11,970 g |

The reactor was purged with nitrogen and ethylene to remove oxygen. 17,110 g of vinyl chloride was charged and then ethylene was charged until a pressure of 65 kg/cm$^2$ was reached. Thereafter, the supply of an 8% aqueous ammonium persulfate solution was started to initiate the polymerization. The polymerization temperature was kept at 50° C. by adjusting the temperature regulator. The polymerization pressure began to increase about 2 hours after the beginning of polymerization and reached 87 kg/cm$^2$ 4.5 hours after the beginning of polymerization. Thereafter, the pressure began to decrease and reached 50 kg/cm$^2$ 7 hours after the beginning of the polymerization. At that time, the concentration of unreacted vinyl acetate in the reaction system was decreased to 0.47% by weight. And, the supply of ammonium persulfate which has been automatically carried out to maintain a polymerization temperature of 50° C. was stopped and the reaction system was cooled to finish the polymerization.

The content of unreacted vinyl chloride in the reactor at the end of the polymerization was analyzed in the same manner as in Example 1.

As the result, the concentration of vinyl chloride in the gaseous phase was 1.1% by weight which corresponded to 246 ppm when converted to the basis of weight of the aqueous dispersion. The concentration in the aqueous phase was 340 ppm.

Next, the contents of the reactor was degassed in the same manner as in Example 1. After degassing for about 2 hours, the concentration of unreacted vinyl chloride in the aqueous emulsion was 9 ppm.

The ultimately obtained aqueous emulsion of vinyl chloride/vinyl acetate/ethylene terpolymer had a solid content of 50% by weight and a viscosity of 780 cps. The content of coarse particles in the emulsion which were not passable through a 100-mesh wire net was 333 ppm. It was found by the chlorine analysis and the hydrolysis method that the terpolymer contained 46% by weight of vinyl chloride, 37% by weight of vinyl acetate and 17% by weight of ethylene.

Reference example

The aqueous emulsions obtained in Example 1 and 2 and Comparative Examples 1 and 2 were each formulated into a synthetic resin emulsion paint for outdoor use by the following recipe.

| Components | part by weight |
|---|---|
| 2 % Aqueous solution of hydroxyethyl cellulose (trade name Cellosize WP-4400H, produced by Union Carbide Corp.) | 225 |
| Tamol 850 (produced by Rohm & Haas) | 6 |
| Emulgen 911 (produced by Kao-Atlas Co., Ltd.) | 4 |
| NOPCO JMY (produced by Sun NOPCO Co., Ltd.) | 2 |
| Texanol (Eastman Kodak Co., Ltd.) | 10 |
| Ethylene glycol | 25 |
| Titanium oxide (trade name Tipaque R-780, produced by Ishihara Sangyo Co., Ltd.) | 150 |
| Calcium carbonate (trade name NS-100, produced by Nitto Funka Kogyo Co., Ltd.) | 150 |
| Clay (trade name ASP-400, produced by Ingelhard Minerals Chemicals Co., Ltd.) | 50 |
| Aqueous emulsion of terpolymer | 360 |

The paints thus obtained were applied twice to a slate by blushing so that the thickness of coating film was 200μ. The film performances were tested and the results are shown in Table 1. Next, synthetic resin emulsion spray-paings (Sound textured coating) were made by mixing 100 parts by weight of the above-mentioned paing and 100 parts by weight of an aggregate comprising 40 parts by weight of coarse sand (Lime stone, 1.5 mm), 40 parts by weight of coarse sand (Lime stone, 1.0 mm) and 20 parts by weight of silica 65. The spray-paints were sprayed on an asbestos slate by means of a mortar gun, and the resultant was exposed outdoor for 3 months to 1 year to test the weatherability thereof. The results are shown in Table 2.

Table 1

| Film performances | | Aqueous emulsion used | | | |
|---|---|---|---|---|---|
| | | Example 1 | Example 2 | Comparative Example 1 | Comparative Example 2 |
| Resistance to efflorescence | | good | good | good | slightly poor |
| Resistance to water | dipping in water for 1 week | good | good | good | good |
| | dipping in water for 2 weeks | good | good | good | slightly poor |
| Resistance to alkali | dipping in 2 % aqueous NaOH solution for 1 week | good | good | good | good |
| | dipping in 2 % aqueous NaOH solution for 2 weeks | good | good | good | slightly poor |

Table 2

| Exposure period | Resistance to weather | Aqueous emulsion used | | | |
|---|---|---|---|---|---|
| | | Example 1 | Example 2 | Comparative Example 1 | Comparative Example 2 |
| 3 Months | State of film | good | good | good | good |
| | Coloration of film | no coloration | no coloration | no coloration | no coloration |
| 6 Months | State of film | the same as above | the same as above | the same as above | cracking appears locally |
| | Coloration of film | | | | slight yellowing |
| 12 Months | State of film | the same as above | the same as above | the same as above | cracking appears all over the coating film |
| | Coloration of film | | | | considerable yellowing |

As is clear from the above Examples, Comparative Examples and Reference Example, according to the present invention (Examples 1 and 2), the content of the unreacted vinyl chloride monomer remained in the reactor at the end of the polymerization is extremely lower and the removal of the monomer is easier in comparison with those in the conventional processes (Comparative Examples 1 and 2). It is apparent from Tables 1 and 2 in Reference Example that the paints from the aqueous emulsions in Examples have the same performances as the paint from the aqueous emulsion in Comparative Example 1.

On the other hand, in Comparative Example 2 wherein all the vinyl chloride monomer were charged in the reactor from the beginning and the polymerization was carried out, the concentration of the unreacted vinyl chloride monomer remained in the reactor at the end of the polymerization is almost the same as in Examples, but the polymerization pressure is not controllable. Further, as is apparent from Tables 1 and 2 in Reference Example, the paint from the aqueous emulsion in Comparative Example 2 tends to be poor in the resistances to water and alkali, and it is extremely poor in the weatherability.

What is claimed is:

1. In the process for producing an aqueous emulsion of vinyl chloride/vinyl acetate/ethylene terpolymer by polymerizing vinyl chloride, vinyl acetate and ethylene in an aqueous dispersion system under an ethylene pressure of 15 to 120 kg/cm² in the presence of an emulsifier and/or protective colloid using a radical initiator at a temperature of 30° to 70° C. while maintaining the pH of the system at 3 to 7, the process comprising a first polymerization step and a second polymerization step to give an aqueous emulsion of vinyl chloride/vinyl acetate/ethylene terpolymer comprising 30 to 70% by weight of vinyl chloride, 15 to 55% by weight of vinyl acetate and 5 to 35% by weight of ethylene, the first polymerization step comprising adding vinyl chloride and vinyl acetate to said aqueous dispersion system at substantially fixed rates while maintaining the concentration of unreacted vinyl acetate in the system in the range of 1.5 to 15% weight based on the total weight of the system, said addition of all the vinyl chloride monomer being completed in the first polymerization step and the second polymerization step comprising adding successively additional vinyl acetate of 3 to 20% by weight based on the total weight of vinyl acetate which has been added until that time in order to maintain the concentration of unreacted vinyl acetate in the aqueous system unchanged and then further continuing the polymerization until the concentration of unreacted vinyl acetate in the system is decreased to 1% by weight or less based on the total weight of the system, wherein the volume of the aqueous dispersion system is at least 50% by volume based on the volume of the reactor when addition of the additional vinyl acetate is completed.

2. The process for producing the aqueous emulsion according to claim 1, wherein the mole number of vinyl chloride added in the first polymerization step is larger than that of vinyl acetate.

3. The process for producing the aqueous emulsion according to claim 1, wherein said terpolymer is copolymerized with at least one monomer of 10% by weight or less based on the terpolymer, said monomer being a member selected from the group consisting of an unsaturated vinyl monomer having a glycidyl group, an unsaturated vinyl monomer having an N-methylol group or alkoxyl group, an unsaturated vinyl monomer having a carboxylic group, an unsaturated vinyl monomer having a hydroxyl group, an unsaturated vinyl monomer having a sulfonic group (or a salt thereof), a vinyl ester of the formula:

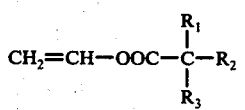

wherein $R_1$, $R_2$ and $R_3$ are each a hydrogen atom or an alkyl group, and the total number of the carbon atoms of $R_1$, $R_2$ and $R_3$ is 1 to 18, and an unsaturated carboxylic ester produced from an unsaturated carboxylic acid or unsaturated dicarboxylic acid and an alcohol having 1 to 12 carbon atoms.

4. The process for producing the aqueous emulsion according to claim 3, wherein said monomer is a member selected from the group consisting of glycidyl acrylate, glycidyl methacrylate, N-methylolacrylamide, N-methylolmethacrylamide, acrylic acid, itaconic acid, maleic acid, acryl alcohol, 2-hydroxyethyl methacrylate, vinylsulfonic acid, allylsulfonic acid, methallylsulfonic acid, 2-sulfoethyl acrylate, vinyl propionate, vinyl butyrate, vinyl pivalate, vinyl laurate, vinyl versatate, methy acrylate, ethyl acrylate, lauryl acrylate, methyl methacrylate, ethyl methacrylate, butyl methacrylate, lauryl methacrylate, itaconic acid, dimethyl, dibutyl or di-2-ethylhexyl ester of itaconic acid, maleic acid or fumaric acid.

* * * * *